United States Patent
Emma et al.

(10) Patent No.: US 10,740,003 B2
(45) Date of Patent: Aug. 11, 2020

(54) LATENCY-AGNOSTIC MEMORY CONTROLLER

(71) Applicant: INTERNATIONAL BUSINESS MACHINES CORPORATION, Armonk, NY (US)

(72) Inventors: Philip G. Emma, Danbury, CT (US); Michael B. Healy, Cortlandt Manor, NY (US); Tejas Karkhanis, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/933,420

(22) Filed: Mar. 23, 2018

(65) Prior Publication Data

US 2019/0294342 A1 Sep. 26, 2019

(51) Int. Cl.
*G06F 3/00* (2006.01)
*G06F 3/06* (2006.01)

(52) U.S. Cl.
CPC .......... *G06F 3/0611* (2013.01); *G06F 3/0658* (2013.01); *G06F 3/0659* (2013.01); *G06F 3/0685* (2013.01)

(58) Field of Classification Search
None
See application file for complete search history.

(56) References Cited

U.S. PATENT DOCUMENTS 7,743,191 B1 6/2010 Liao
9,229,523 B2 1/2016 Ware et al.
2013/0124786 A1 5/2013 Doering et al.
2018/0005670 A1* 1/2018 Lee .................. G06F 3/061

OTHER PUBLICATIONS

Anonymously, "Latency Agnostic Memory Controller with Command Scoreboarding," http://ip.com/IPCOM/000248472D, Dec. 5, 2016, pp. 1-4.
Anonymously, "Method for Intelligent Command Queuing in Memory," http://ip.com/IPCOM/000009805D, Sep. 19, 2002, pp. 1-3.
Anonymously, "QoS Mechanism for Retry Based Memory Controllers," http://ip.com/IPCOM/000244718D, Jan. 6, 2016, pp. 1-3.
Chatterjee, N., "Designing Efficient Memory Schedulers for Future Systems," University of Utah, Doctor of Philosophy Degree Dissertation, Dec. 2013, pp. 1-124.

* cited by examiner

*Primary Examiner* — Midys Rojas
(74) *Attorney, Agent, or Firm* — Cantor Colburn LLP; Kevin Michael Jordan (57) ABSTRACT

A computer-implemented method includes receiving, at a memory controller, a new transaction request referencing a new transaction to be executed on a memory. The memory includes two or more memory groups embodying two or more memory technologies, and the memory controller includes two or more group request queues with a respective group request queue corresponding to each memory group of the two or more memory groups. A memory group is selected, by the memory controller, from among the two or more memory groups. The transaction request is placed, by the memory controller, on the respective group request queue corresponding to the selected memory group. The new transaction is executed on the selected memory group. A new response to the new transaction is received, by the memory controller, from the selected memory group. The new response is returned.

17 Claims, 3 Drawing Sheets

LATENCY-AGNOSTIC MEMORY CONTROLLER

STATEMENT REGARDING FEDERALLY SPONSORED RESEARCH OR DEVELOPMENT

This invention was made with Government support under Contract No. DE-AC52-07NA27344, awarded by the Department of Energy. The Government has certain rights to this invention.

BACKGROUND

The present invention relates to memory management and, more specifically, to a latency-agnostic memory controller.

Generally, a memory controller handles reading from and writing to computer memory. More specifically, a memory controller reads and writes to one kind of memory, dynamic random-access memory (DRAM). DRAM uses a deterministic protocol with fixed-access latency and, as a result, yields predictability with respect to response times. A memory controller inserts requests to access memory into a first-in-first-out (FIFO) queue and addresses those requests in order, with responses being returned in order due to the fixed-access latency. Recently, however, there have been efforts to combine multiple types of memory on a single computer.

SUMMARY

Embodiments of the present invention are directed to a computer-implemented method for executing a transaction in memory. A non-limiting example of the computer-implemented method includes receiving, at a memory controller, a new transaction request referencing a new transaction to be executed on a memory. The memory includes two or more memory groups embodying two or more memory technologies, and the memory controller includes two or more group request queues with a respective group request queue corresponding to each memory group of the two or more memory groups. A memory group is selected, by the memory controller, from among the two or more memory groups. The transaction request is placed, by the memory controller, on the respective group request queue corresponding to the selected memory group. The new transaction is executed on the selected memory group. A new response to the new transaction is received, by the memory controller, from the selected memory group. The new response is returned.

Embodiments of the present invention are directed to a memory controller. The memory controller is configured to receive a new transaction request referencing a new transaction to be executed on a memory. The memory includes two or more memory groups embodying two or more memory technologies, and the memory controller includes two or more group request queues with a respective group request queue corresponding to each memory group of the two or more memory groups. The memory controller is further configured to select a memory group of the two or more memory groups, and to place the transaction request on the respective group request queue corresponding to the selected memory group. The memory controller is further configured to execute the new transaction on the selected memory group. The memory controller is further configured to receive, from the selected memory group, a new response to the new transaction request, and to return the new response.

Embodiments of the invention are directed to a computer-program product for executing a transaction in memory, the computer-program product comprising a computer-readable storage medium having program instructions embodied therewith. The program instructions are executable by a processor to cause the processor to perform a method. A non-limiting example of the method includes receiving, at a memory controller, a new transaction request referencing a new transaction to be executed on a memory. The memory includes two or more memory groups embodying two or more memory technologies, and the memory controller includes two or more group request queues with a respective group request queue corresponding to each memory group of the two or more memory groups. Further according to the method, a memory group is selected, by the memory controller, from among the two or more memory groups. The transaction request is placed, by the memory controller, on the respective group request queue corresponding to the selected memory group. The new transaction is executed on the selected memory group. A new response to the new transaction is received, by the memory controller, from the selected memory group. The new response is returned.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, there have been recent efforts to combine multiple types, or technologies, of memory on a single computer system. Known mechanisms for addressing the problem of multiple memory types provide a shared queue for managing requests to access that memory. If the queue fills up with requests for one memory type, another memory types may be starved out, despite being available for use, while waiting for those requests to complete in order. Thus, these known mechanisms are inefficient.

Current memory controllers assume a uniform set of parameters and deterministic, known latencies for memory. Some new memory technologies, however, have non-deterministic command processing times. While some applications will perform best on DRAM, other applications may benefit from a different memory technology, depending on the tasks needing to be performed. Thus, as several competing memory technologies become available, combining two or more of these memory technologies would be beneficial.

Turning now to an overview of aspects of the invention, one or more embodiments of the invention address the above-described shortcomings of the prior art by providing a memory controller that can handle a diverse set of timing parameters, including non-deterministic command response times. According to some embodiments of this invention, the memory controller maintains a respective command queue and respective response queue for each memory type, or memory technology. When a request to access memory is received, the memory controller determines which memory type to use and places the request on the associated command queue. When the request has been fulfilled by access to the memory, a response is then placed on the associated response queue. A client computer system on which the memory controller resides need not be aware of these operations, but may instead behave as though a single type of memory is being used, thus relying on the memory controller to manage the multiple memory technologies.

The above-described aspects of the invention address the shortcomings of the prior art by enabling multiple memory technologies to be serviced by a single memory controller. The client computer system as a whole may thus run more efficiently for a wider range of applications, through the use of multiple memory technologies that avoid starving one another out.

Figure 1:
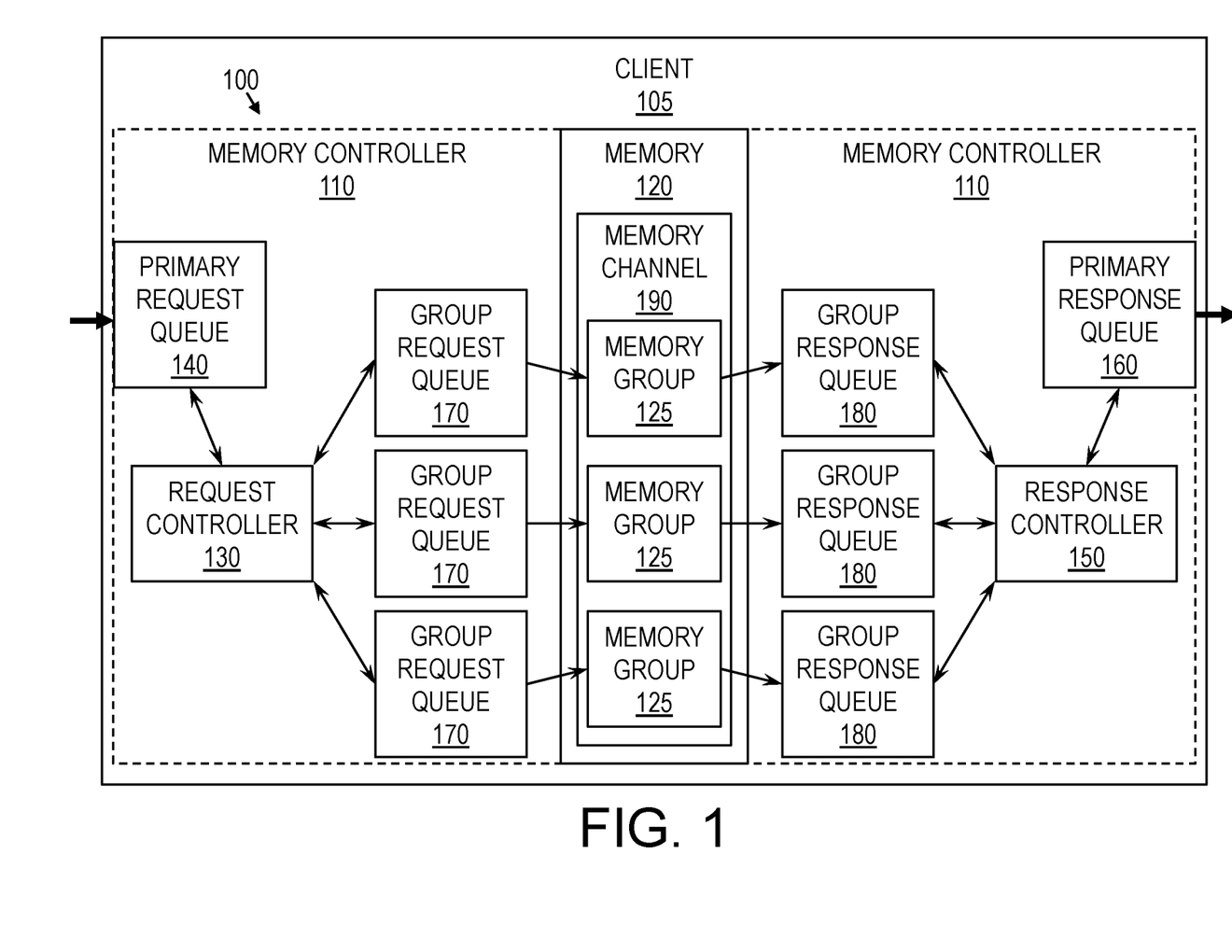
FIG. 1 is a diagram of a memory system according to some embodiments of this invention.
Figure 3:
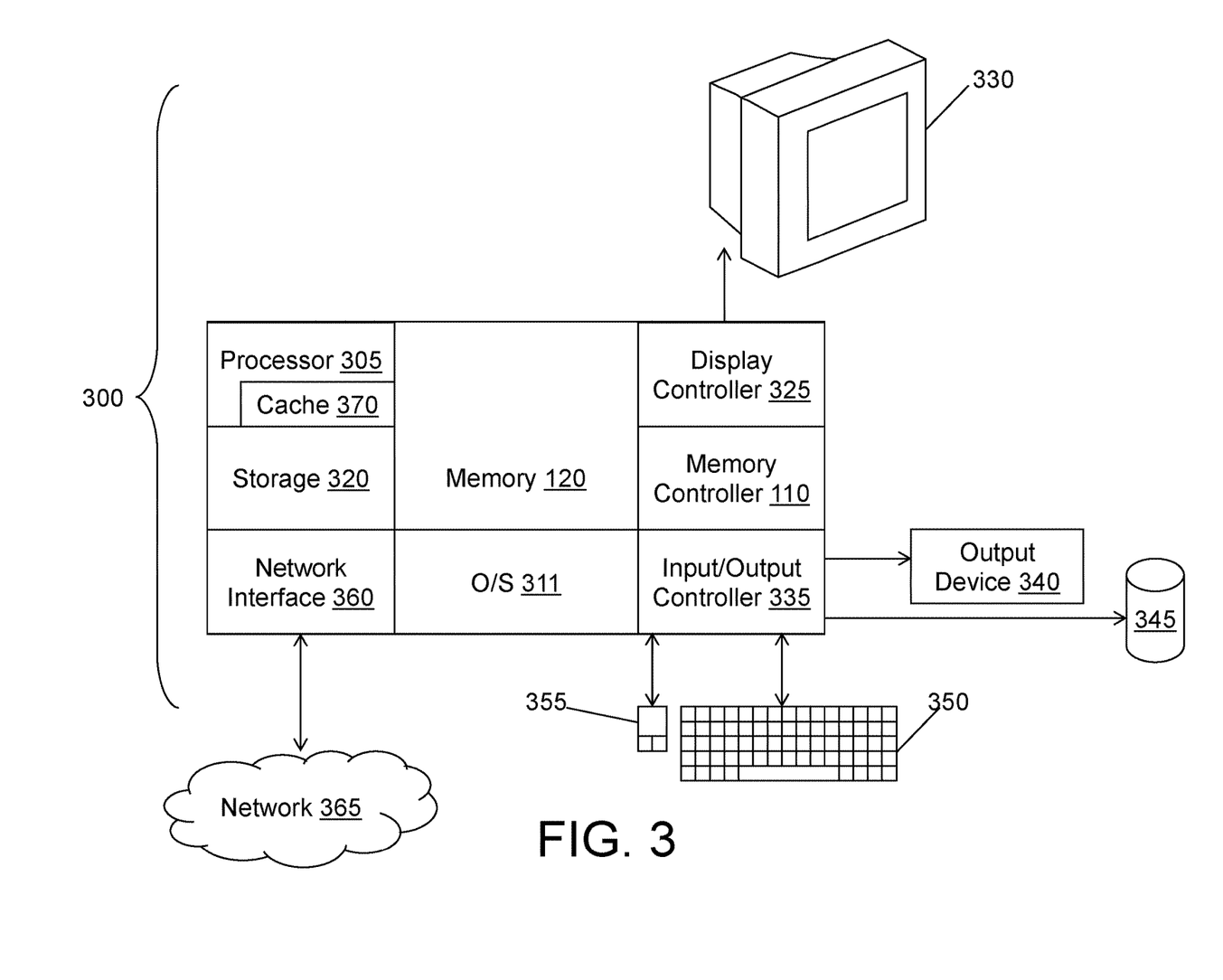
FIG. 3 is a block diagram of a computer system for implementing some or all aspects of the memory system, according to some embodiments of this invention.

Turning now to a more detailed description of aspects of the present invention, FIG. 1 is a diagram of a memory system according to some embodiments of this invention. As shown in FIG. 1, the memory system 100 may include a memory controller 110, a memory 120, a request controller 130, a primary request queue 140, a response controller 150, and a primary response queue 160. Generally, the request controller 130 may use the primary request queue 140 to manage transaction requests to access the memory 120, and the response controller 150 may use the primary response queue 160 to manage responses to those transaction requests. It will be understood that the request controller 130, the primary request queue 140, the response controller 150, and the primary response queue 160 may be implemented in hardware, software, or a combination of both. For example, and not by way of limitation, each of these may be implemented as a hardware circuit or as computer instructions. The memory system 100 may be incorporated into a client 105, which may be a computer system 300 as shown in FIG. 3, and the memory system 100 may manage memory transactions on the client 105.

Shown in FIG. 1, the memory 120 may include one or more memory groups 125. Each memory group may include one or more memory chips having a single memory types, or memory technology. However, in some embodiments of the invention, the one or more memory groups 125 include at least two memory groups 125, where those memory groups 125 have different memory types. For example and not by way of limitation, each memory group 125 of the memory 120 may have a distinct memory type from other memory groups 125 of the memory 120. For instance, each of the one or more memory groups may utilize one of the following technologies: DRAM, flash memory, phase-change memory (PCM), resistive random-access memory (RAM), or others. In some embodiments of the invention, each of the one or more memory groups 125 of the memory 120 may reside on a single memory channel 190. It will be understood, however, that the client 105 may include additional memory channels 190 as well.

In some embodiments of the invention, the memory controller 110 has a split-request-queue design, which may work well for non-uniform-latency memory. Within the memory controller 110, transaction requests may arrive at the primary request queue 140 and may leave from the primary response queue 160. Internally, the transaction requests may be distributed to various group queues corresponding to the various memory groups 125. To this end, the memory controller 110 may include one or more group request queues 170 and one or more group response queues 180. In some embodiments of the invention, there is a one-to-one-to-one mapping between group request queues 170, group response queues 180, and memory groups 125, such that each memory group 125 corresponds to a unique group request queue 170 and further corresponds to a unique group response queue 180, and such that each group request queue 170 corresponds to a unique group response queue 180. Generally, for each transaction request received, the memory controller 110 may take the transaction request from the primary request queue 140 and place it on a group request queue 170 corresponding to the memory group 125 selected to process the transaction referenced in the transaction request. The selected memory group 125 may process the transaction in queue order and return a response to the corresponding group response queue 180, which may in turn return that response to the primary request queue 140 for return to the client 105. The use of these queues will be described in more detail below.

Each of the one or more group request queues 170 and the one or more group response queues 180 may be implemented in hardware, software, or a combination of both. For example, and not by way of limitation, each of these may be implemented as a hardware circuit or as computer instructions. It will be understood by one skilled in the art that the components are shown in FIG. 1 and described as being distinct for illustrative purposes, but that these components may integrated together or further divided based on design decisions.

In some embodiments of the invention, for a particular memory group 125 of the memory 120, the respective group request queue 170 and group response queue 180 may be part of a memory subcontroller. In other words, the memory controller 110 may be made up one or more memory subcontrollers, each of which may be similar to a conventional memory controller. In such embodiments of the invention, the memory controller 110 may be implemented as a combination of these memory subcontrollers along with the primary request controller 130 and the primary response controller 150.

Figure 2:
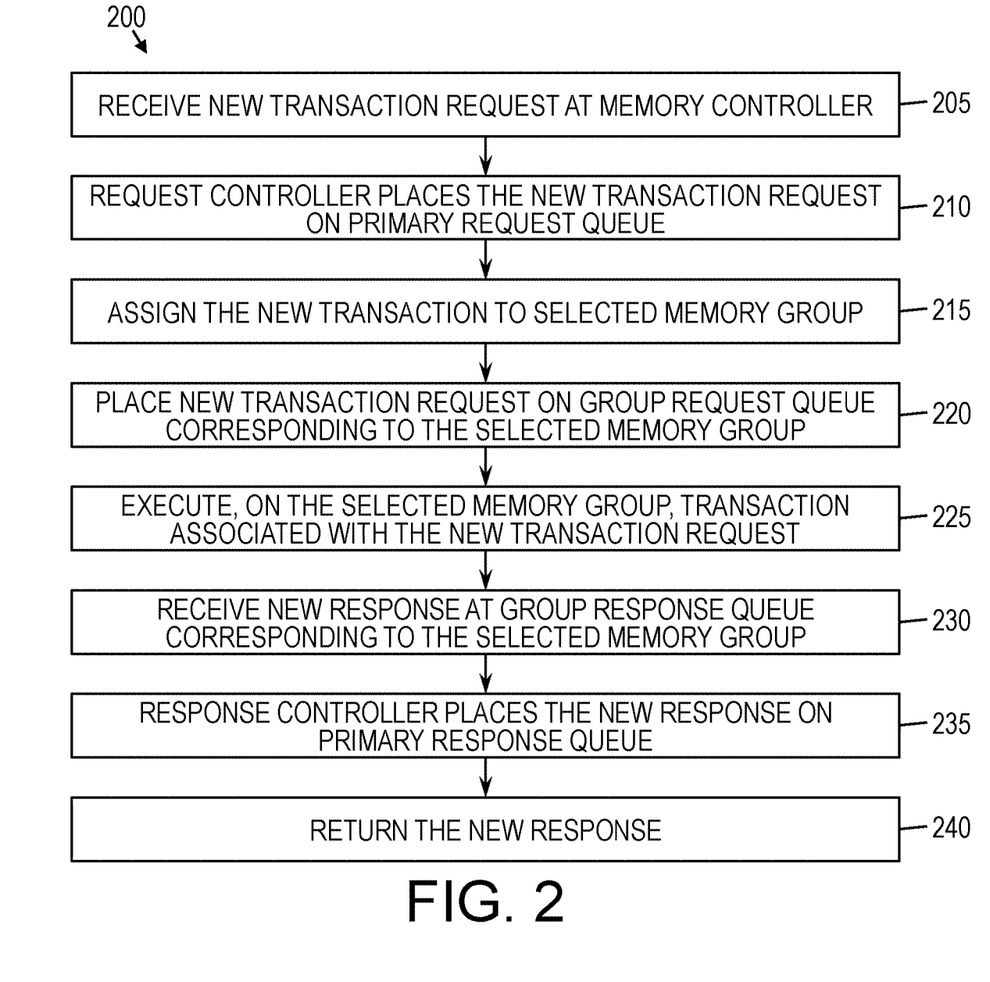
FIG. 2 is a flow diagram of a method for executing a transaction in memory, according to some embodiment of this invention.

FIG. 2 is a flow diagram of a method 200 for executing a transaction in memory, using the memory controller 110 according to some embodiment of this invention. As shown in FIG. 2, at block 205, a new transaction request may be received at the memory controller 110. The transaction request may be a request for a transaction, where that transaction includes reading from or writing to the memory 120. At block 210, the memory controller 110 may place the new transaction request on the primary request queue 140.

At a given time, the primary request queue 140, which may be managed by the request controller 130, may maintain a plurality of transaction requests that have been received by the memory controller 110 and have been placed on the primary request queue 140 for handling. In some embodiments of the invention, the primary request queue 140 may be a FIFO queue, and thus transaction requests may be handled in the order in which they were added to the queue. Specifically, for each transaction request, the request controller 130 may handle the transaction request by selecting a memory group 125 and delivering the transaction request to the group request queue 170 of that memory group. As such, at block 215, the request controller 130 may select a memory group 125 for the new transaction request and, in doing so, may assign the new transaction request to the selected memory group 125.

As discussed above, each memory group 125 may correspond to a memory type. Thus, determination of which memory group 125 to select for the new transaction request may be based on various factors, such as one or more of the following: transaction priority, transaction type, capacity of the respective group request queues 170 of the memory groups 125, memory type specified in the transaction request, and a memory address specified in the transaction request. In some embodiments of the invention, the request controller 130 may attempt to balance the loads on the various memory groups 125, and may assign the new transaction request with load balancing in mind. Further, in some embodiments of the invention, the client 105 does not need to know which memory group 125 or which memory type is used for each transaction. Alternatively, however, a transaction request may specify a memory type, and the request controller 130 may then assign that transaction request to a memory group 125 having the specified memory type. As discussed above, each memory group 125 may correspond to a respective group request queue 170 and a respective group response queue 180. For each transaction request, after selecting a memory group 125, the request controller 130 may place the transaction request on the group request queue 170 corresponding to the selected memory group 125 for that transaction request. As such, at block 220, the new transaction request may be placed on the group request queue 170 corresponding to the memory group 125 selected for it.

In some embodiments of the invention, each of the one or more group request queues 170 may be FIFO queues, and thus each transaction request in a given group request queue 170 may be handled in the order in which the transaction requests were placed on that group request queue 170. Specifically, the handling of a transaction request may include execution of the associated transaction (e.g., reading or writing) on the memory group 125. In some embodiments of the invention, to simplify memory address translation and thereby memory access, static address partitioning may be used in the one or more memory groups 125. However, it will be understood that static address partitioning is not required and that dynamic address partitioning may be used with appropriate changes, such as table lookup. At block 225, when the new transaction request's turn arises in the respective group request queue 170, a transaction associated with the new transaction request may be executed on the selected memory group 125.

After each transaction request is processed (i.e., after the associated transaction is processed), the response to, or result of, the memory access may be stored in the group response queue 180 that corresponds to the memory group 125. The response to the transaction may be, for example, data read from the memory 120 or a confirmation that data has been written to the memory 120. As such, at block 230, a new response to the new transaction may be received, from the selected memory group 125, at the group response queue 180 corresponding to the selected memory group 125.

The response controller 150 may manage the primary response queue 160, which may maintain a plurality of responses to transactions executed across the various memory groups 125. To this end, the response controller 150 may select responses from the various group response queues 180 and may insert those responses into the primary response queue 160. In some embodiments of the invention, where it is desirable to return responses in the order in which their respective transaction requests were received, the response controller 150 may select responses from the group response queues 180 in the order in which the respective transaction requests were received by the memory controller, and may place those responses on the primary response queue 160 in that order. In some embodiments of the invention, the primary response queue 160 is a FIFO queue, and thus responses placed on the primary response queue 160 may be handled in the order in which those responses are placed. As such, at block 235, the response controller 150 may place the new response on the primary response queue 160.

It will be understood by those skilled in the art, however, that responses need not be returned by the memory controller 110 in the order in which transaction requests were received. In such embodiments of the invention, where responses are not required to be returned in order, the response controller 150 need not select responses from the group response queues 180 according to transaction request order. For instance, the response controller 150 may select responses as they become available on the various group response queues 180. When responses are not required to be returned in order, the memory controller 110 may tag responses to indicate which response matches which transaction request, so that the client 105 can properly utilize the responses.

The response controller 150 may return each response on the primary response queue 160 to the client 105 according to queue order. As a result, the client 105 may use these responses in the normal course of computing, as would be the case with a conventional memory controller. As such, at block 240, the response controller 150 may select the new response from the primary response queue 160 and return the new response to the client 105.

Thus, according to some embodiments of the invention, the memory controller 110 may process a plurality of transaction requests, where those transaction requests are processed across a variety of memory types. Further, in some embodiments of the invention, this processing by a single memory controller 110 is performed such that no transaction to be processed on one memory type is required to wait for a transaction to be processed on a different memory type.

FIG. 3 is a block diagram of a computer system for implementing some or all aspects of the memory system, according to some embodiments of this invention. The memory systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 120 coupled to a memory controller 110, and one or more input devices 345 and/or output devices 340, such as peripherals, that are communicatively coupled via a local I/O controller 335. In some embodiments of the invention, the memory 120 shown in FIG. 3 may be the same memory 120 shown in FIG. 1, and the memory controller 110 of FIG. 3 may be same memory controller 110 of FIG. 1. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 120. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 120 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, or other types of storage media. Note that the memory 120 may have a distributed architecture, where various components are situated remote from one another but may be accessed by the processor 305.

The instructions in memory 120 may include one or more separate programs, each of which comprises an ordered listing of executable instructions for implementing logical functions. In the example of FIG. 3, the instructions in the memory 120 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Memory systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a read-only memory (ROM), an erasable programmable read-only memory (EPROM or flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, at a memory controller, a new transaction request referencing a new transaction to be executed on a memory;
   wherein the memory comprises two or more memory groups embodying two or more memory technologies, and wherein the memory controller comprises a group request queue for each memory group of the two or more memory groups;
   selecting, by the memory controller, a selected memory group of the two or more memory groups, wherein selecting the selected memory group comprises considering a capacity of the group request queues for each memory group of the two or more memory groups;
   placing, by the memory controller, the transaction request on the respective group request queue corresponding to the selected memory group;
   executing the new transaction on the selected memory group;
   receiving, by the memory controller, from the selected memory group, a new response to the new transaction request; and
   returning the new response.

2. The computer-implemented method of claim 1, wherein the memory controller comprises two or more group response queues comprising a respective group response queue corresponding to each memory group of the two or more memory groups, and wherein the receiving the new response to the new transaction request comprises receiving the new response at the respective group response queue corresponding to the selected memory group.

3. The computer-implemented method of claim 2, wherein returning the new response comprises:
   selecting a plurality of transaction responses from the two or more group response queues, wherein each of the plurality of transaction responses corresponds to a respective transaction request of a plurality of transaction requests, and wherein the selecting the plurality of transaction responses is based on an order of the plurality of transaction requests;
   placing each of the plurality of transaction responses on a primary response queue in an order in which the selecting the plurality of transaction responses occurs; and
   returning the plurality of transaction responses in an order of the primary response queue.

4. The computer-implemented method of claim 2, wherein returning the new response comprises:
   selecting a plurality of transaction responses from the two or more group response queues, wherein the selecting the plurality of transaction responses is based on when the plurality of transaction responses are received;
   placing each of the plurality of transaction responses on a primary response queue in an order in which the selecting the plurality of transaction responses occurs; and
   returning the plurality of transaction responses in an order of the primary response queue.

5. The computer-implemented method of claim 1, wherein a first memory group of the two or more memory groups comprises a dynamic random-access memory (DRAM) chip, and wherein a second memory group of the two or more memory groups comprises a memory chip that is not DRAM.

6. The computer-implemented method of claim 1, wherein the two or more memory groups reside on a common memory channel.

7. A memory controller configured to:
   receive a new transaction request referencing a new transaction to be executed on a memory;
   wherein the memory comprises two or more memory groups embodying two or more memory technologies, and wherein the memory controller comprises a group request queue for each memory group of the two or more memory groups;
   select a selected memory group of the two or more memory groups, wherein the selected memory group is selected based on a capacity of the group request queues for each memory group of the two or more memory groups;
   place the transaction request on the respective group request queue corresponding to the selected memory group;
   execute the new transaction on the selected memory group;
   receive, from the selected memory group, a new response to the new transaction request; and
   return the new response.

8. The memory controller of claim 7, wherein the memory controller comprises two or more group response queues comprising a respective group response queue corresponding to each memory group of the two or more memory groups, and wherein the receiving the new response to the new transaction request comprises receiving the new response at the respective group response queue corresponding to the selected memory group.

9. The memory controller of claim 8, wherein returning the new response comprises:
   selecting a plurality of transaction responses from the two or more group response queues, wherein each of the plurality of transaction responses corresponds to a respective transaction request of a plurality of transaction requests, and wherein the selecting the plurality of transaction responses is based on an order of the plurality of transaction requests;

placing each of the plurality of transaction responses on a primary response queue in an order in which the selecting the plurality of transaction responses occurs; and returning the plurality of transaction responses in an order of the primary response queue.

10. The memory controller of claim 8, wherein returning the new response comprises:

selecting a plurality of transaction responses from the two or more group response queues, wherein the selecting the plurality of transaction responses is based on when the plurality of transaction responses are received;

placing each of the plurality of transaction responses on a primary response queue in an order in which the selecting the plurality of transaction responses occurs; and returning the plurality of transaction responses in an order of the primary response queue.

11. The memory controller of claim 7, wherein a first memory group of the two or more memory groups comprises a dynamic random-access memory (DRAM) chip, and wherein a second memory group of the two or more memory groups comprises a memory chip that is not DRAM.

12. The memory controller of claim 7, wherein the two or more memory groups reside on a common memory channel.

13. A computer-program product for executing a transaction in memory, the computer-program product comprising a computer-readable storage medium having program instructions embodied therewith, the program instructions executable by a processor to cause the processor to perform a method comprising:

receiving, at a memory controller, a new transaction request referencing a new transaction to be executed on a memory;

wherein the memory comprises two or more memory groups embodying two or more memory technologies, and wherein the memory controller comprises a group request queue for each memory group of the two or more memory groups;

selecting, by the memory controller, a selected memory group of the two or more memory groups, wherein selecting the selected memory group comprises considering a capacity of the group request queues for each memory group of the two or more memory groups;

placing, by the memory controller, the transaction request on the group request queue corresponding to the selected memory group;

executing the new transaction on the selected memory group;

receiving, by the memory controller, from the selected memory group, a new response to the new transaction request; and returning the new response.

14. The computer-program product of claim 13, wherein the memory controller comprises two or more group response queues comprising a group response queue corresponding to each memory group of the two or more memory groups, and wherein the receiving the new response to the new transaction request comprises receiving the new response at the group response queue corresponding to the selected memory group.

15. The computer-program product of claim 14, wherein returning the new response comprises:

selecting a plurality of transaction responses from the two or more group response queues, wherein each of the plurality of transaction responses corresponds to a respective transaction request of a plurality of transaction requests, and wherein the selecting the plurality of transaction responses is based on an order of the plurality of transaction requests;

placing each of the plurality of transaction responses on a primary response queue in an order in which the selecting the plurality of transaction responses occurs; and returning the plurality of transaction responses in an order of the primary response queue.

16. The computer-program product of claim 14, wherein returning the new response comprises:

selecting a plurality of transaction responses from the two or more group response queues, wherein the selecting the plurality of transaction responses is based on when the plurality of transaction responses are received;

placing each of the plurality of transaction responses on a primary response queue in an order in which the selecting the plurality of transaction responses occurs; and returning the plurality of transaction responses in an order of the primary response queue.

17. The computer-program product of claim 13, wherein a first memory group of the two or more memory groups comprises a dynamic random-access memory (DRAM) chip, and wherein a second memory group of the two or more memory groups comprises a memory chip that is not DRAM.

* * * * *